(12) United States Patent
Yagiura

(10) Patent No.: US 7,653,811 B2
(45) Date of Patent: Jan. 26, 2010

(54) SELECTING A REPOSITORY SATISFYING A SECURITY LEVEL OF DATA

(75) Inventor: Yutaka Yagiura, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 880 days.

(21) Appl. No.: 11/212,867

(22) Filed: Aug. 26, 2005

(65) Prior Publication Data

US 2006/0047659 A1    Mar. 2, 2006

(30) Foreign Application Priority Data

Aug. 26, 2004    (JP) .............................. 2004-247055

(51) Int. Cl.
*H04L 29/06*    (2006.01)
*H04N 7/16*    (2006.01)
*G06F 7/00*    (2006.01)
*G06F 17/30*    (2006.01)

(52) U.S. Cl. .................... 713/166; 726/27; 726/30; 707/1; 707/100

(58) Field of Classification Search ...................... None
See application file for complete search history.

(56) References Cited

U.S. PATENT DOCUMENTS 6,236,971 B1*  5/2001  Stefik et al. .................... 705/1
2004/0199566 A1* 10/2004  Carlson et al. ............... 709/201

FOREIGN PATENT DOCUMENTS

JP    2002-269093    9/2002
JP    2005-175595    6/2005

* cited by examiner

*Primary Examiner*—Kaveh Abrishamkar
(74) *Attorney, Agent, or Firm*—Cooper & Dunham, LLP

(57) ABSTRACT

A device, apparatus, system, computer program and product, each capable of selecting a storage repository for storing data from a plurality of repositories, by applying a repository rule indicating which of the plurality of repositories can satisfy a security level of the data.

20 Claims, 12 Drawing Sheets

FIG. 4

| ISMS LEVEL | | FEATURES | |
|---|---|---|---|
| CONFIDENTIALITY | | ACCESS CONTROL | ENCRYPTION |
| | 1 | — | — |
| | 2 | O | — |
| | 3 | O | O |
| INTEGRITY | | DOCUMENT PROTECTION | WATERMARK |
| | 1 | — | — |
| | 2 | O | — |
| | 3 | O | O |
| AVAILABILITY | | SECONDARY REPOSITORY | AUXILIARY POWER |
| | 1 | — | — |
| | 2 | O | — |
| | 3 | O | O |

FIG. 5

| REPOSITORY | ACCESS CONTROL | ENCRYPTION | DOCUMENT PROTECTION | WATERMARK | DATA RECOVERY | SECONDARY REPOSITORY | AUXILIARY POWER |
|---|---|---|---|---|---|---|---|
| 1 | ○ | ○ | ○ | × | ○ | ○ | × |
| 2 | × | × | × | × | × | × | × |
| 3 | ○ | ○ | × | × | × | × | × |
| 4 | ○ | ○ | ○ | ○ | × | ○ | ○ |

FIG. 6

| REPOSITORY | CONFIDENTIALITY | INTEGRITY | AVAILABILITY |
|---|---|---|---|
| 1 | 3 | 2 | 2 |
| 2 | 1 | 1 | 1 |
| 3 | 3 | 1 | 1 |
| 4 | 3 | 3 | 3 |

FIG. 11

| ISMS LEVEL | | FEATURES | |
|---|---|---|---|
| | | ACCESS CONTROL | ENCRYPTION |
| CONFIDENTIALITY | 1 | — | — |
| | 2 | — | O |
| | 3 | O | O |
| | | DATA RECOVERY | |
| INTEGRITY | 1 | — | |
| | 2 | O | |
| | 3 | O | |
| | | SECONDARY REPOSITORY | AUXILIARY POWER |
| AVAILABILITY | 1 | — | — |
| | 2 | O | — |
| | 3 | O | O |

FIG. 12

| ISMS LEVEL | | FEATURES | | |
|---|---|---|---|---|
| CONFIDENTIALITY | | ACCESS CONTROL | ENCRYPTION | |
| | 1 | — | — | |
| | 2 | O | O | |
| | 3 | O | O | |
| INTEGRITY | | DOCUMENT PROTECTION | WATERMARK | DATA RECOVERY |
| | 1 | — | — | — |
| | 2 | O | — | O |
| | 3 | O | O | O |
| AVAILABILITY | | SECONDARY REPOSITORY | AUXILIARY POWER | |
| | 1 | — | — | |
| | 2 | O | — | |
| | 3 | O | O | |

US 7,653,811 B2

SELECTING A REPOSITORY SATISFYING A SECURITY LEVEL OF DATA

FIELD

The following disclosure relates generally to selecting a repository satisfying a security level of data.

DESCRIPTION OF RELATED ART

With increased awareness for information security, an ISMS (information security management system) is adopted by a number of organizations. An objective of an ISMS is typically to methodically operate an organization's management system for information security through determining the necessary security level for each of its information assets based on its own risk assessment, making up plans, and distributing its assets, along with technical countermeasures against each individual issue.

For example, to be in compliance with the ISMS, a user needs to check for a security level assigned to data before storing it in a repository, and further determine whether the repository satisfies the security level of the data. If the repository does not satisfy the security level, the user may need to search for another repository that satisfies the security level of the data.

SUMMARY

The present disclosure provides methods, devices, apparatuses, systems, computer programs and products, each capable of selecting a storage repository for storing data from a plurality of repositories, by applying a repository rule indicating which of the plurality of repositories can satisfy a security level of the data.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4 shows an exemplary ISMS level table stored in the repository management device of FIG. 2, according to an exemplary embodiment;

FIG. 5 shows an exemplary repository features table stored in the repository management device of FIG. 2, according to an exemplary embodiment;

FIG. 6 shows an exemplary repository rule table stored in the repository management device of FIG. 2, according to an exemplary embodiment;

FIG. 11 shows a graphical representation of an exemplary ISMS level table of a partner company stored in the information management system shown in FIG. 10, according to an exemplary embodiment;

FIG. 12 shows a graphical representation of an exemplary ISMS level table generated by combining the ISMS level table of FIG. 4 and the ISMS level table of FIG. 11;

DETAILED DESCRIPTION OF EMBODIMENTS

Figure 1:
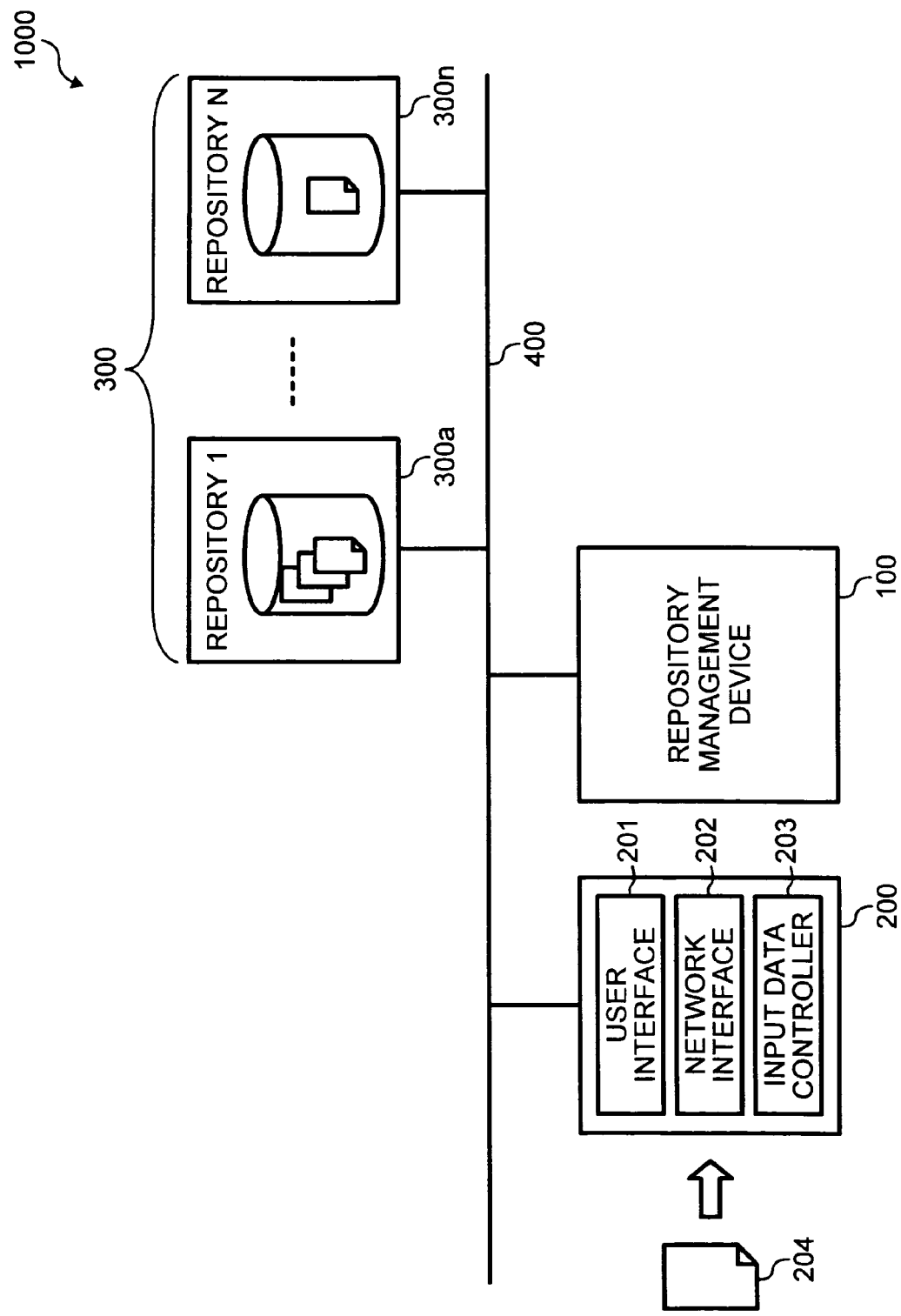
FIG. 1 shows a schematic block diagram illustrating an information management system according to an exemplary embodiment of the present disclosure.

In describing the preferred embodiments illustrated in the drawings, specific terminology is employed for clarity. However, the disclosure of this patent specification is not intended to be limited to the specific terminology selected and it is to be understood that each specific element includes all technical equivalents that operate in a similar manner. Referring now to the drawings, wherein like reference numerals designate identical or corresponding parts throughout the several views, FIG. 1 illustrates an information management system 1000 according to an exemplary embodiment of the present disclosure.

The information management system 1000 of FIG. 1 includes a repository management device ("management device") 100, a multifunctional apparatus (MFP) 200, and repositories 300. These devices are connected via a network 400, such as a local area network (LAN) or the Internet.

The MFP 200 may be implemented by an image forming apparatus having functions of printing, copying, faxing, and scanning. The MFP 200 mainly includes a user interface 201 including an operational panel, a network interface 202, and an input data controller 203. In addition to these devices, the MFP 200 may include other devices to operate at least one of the above-described functions.

The repositories 300 include a plurality of first to Nth repositories 300a to 300n. Any one of the repositories 300 may be implemented by a data processing apparatus, such as an image processing apparatus or information processing apparatus, including at least a processor and a storage device.

The management device 100 includes at least a processor capable of controlling an operation of maintaining and improving information security of the system 1000.

In an exemplary operation, the MFP 200 receives a request command for storing input data 204 in compliance with the ISMS from a user through the user interface 201. The input data 204 may be generated from a printed document by using the scanning function of the MFP 200. Alternatively, the input data 204 may be obtained from any other device on the network 400 as electronic data. Alternatively, the input data 204 may be previously stored in the MFP 200 as electronic data.

In this exemplary embodiment, the input data 204 is assigned with an ISMS level, which indicates a security level determined by an administrator or a user of the system 1000 in compliance with the ISMS. The ISMS level may be classified into three levels: a confidentiality level indicating a security level for maintaining and improving confidentiality of data; an integrity level indicating a security level for maintaining and improving integrity of data; and an availability level indicating a security level for maintaining and improving availability of data. Each of the confidentiality, integrity, and availability levels may be further broken down into a plurality of levels from lowest to highest according to the level of security required. For example, the confidentiality level may be further classified into a high confidentiality level ("confidentiality level 3"), medium confidentiality level ("confidentiality level 2"), and low confidentiality level ("confidentiality level 1"). The integrity level may be further classified into a high integrity level ("integrity level 3"), medium integrity level ("integrity level 2"), and low integrity level ("integrity level 1"). The availability level may be further classified into a high availability level ("availability level 3"), medium availability level ("availability level 2"), and low availability level ("availability level 1"). For example, a user or an administrator may assign the input data 204 with an ISMS level having the confidentiality level 3, integrity level 2, and availability level 2, in compliance with the ISMS.

Upon receiving the request command for storing from the user, the MFP 200 sends a request command to the management device 100 for selecting a repository for storing the input data 204. At the same time, the MFP 200 notifies the management device 100 of the ISMS level of the input data 204. The management device 100 selects one of the repositories 300, which can satisfy the ISMS level of the input data 204, as a repository for storing the input data 204, by applying a repository rule.

In this exemplary embodiment, each of the repositories 300a to 300n is provided with a processor capable of providing features and capabilities that help to maintain and improve security of data. For example, the first repository 300a may be provided with a processor capable of encrypting data before storing it into a storage device, thus maintaining and improving confidentiality of the data. These feature and capabilities (collectively referred to as the "features"), which may be different for each of the repositories 300, can be classified into three groups: a confidentially feature group including features for maintaining and improving confidentiality of data; an integrity feature group including features for maintaining and improving integrity of data; and an availability feature group including features for maintaining and improving availability of data.

The management device 100 analyzes a set of feature groups for each of the repositories 300, and generates a repository rule indicating which of the repositories 300 can satisfy a specific ISMS level of input data. By applying the repository rule, the management device 100 can select a repository suitable for storing the input data 204 in compliance with the ISMS.

After making the selection, the management device 100 notifies the MFP 200 of the selection, i.e., the selected repository. The MFP 200 sends the input data 204 to one of the repositories 300, which has been selected by the management device 100, via the network interface 202.

Figure 2:
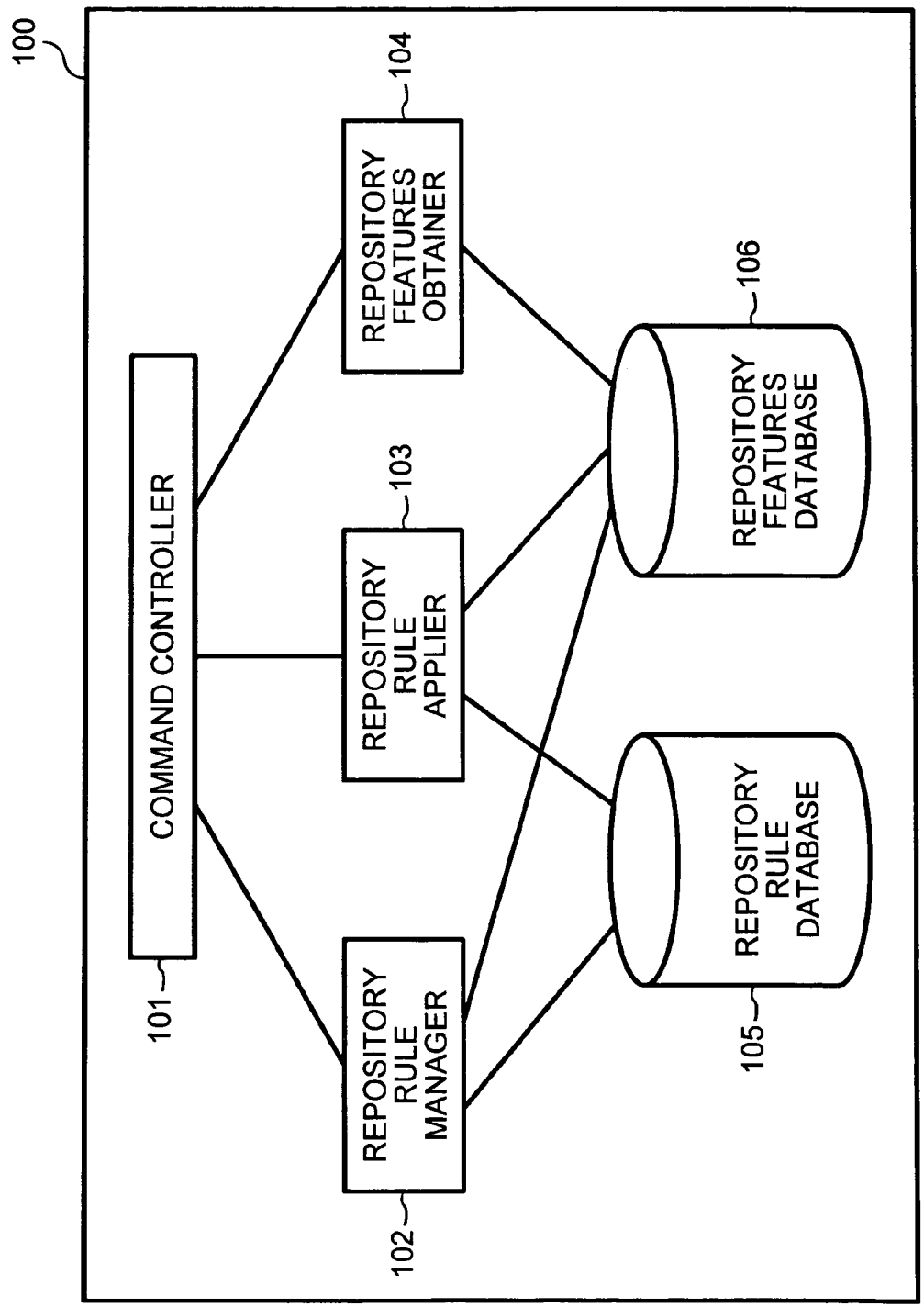
FIG. 2 shows a schematic block diagram illustrating a repository management device shown in FIG. 1 according to an exemplary embodiment.

Referring now to FIG. 2, a structure of the management device 100 is described according to an exemplary embodiment of the present disclosure.

As shown in FIG. 2, the management device 100 includes a command controller 101, repository rule manager 102, repository rule applier 103, repository features obtainer 104, repository rule database 105, and repository features database 106.

The command controller 101 receives a command, such as a request command or a response command, from the MFP 200 or at least one of the repositories 300, via the network 400. The command controller 101 sends the received command to at least one of the repository rule manager 102, repository rule applier 103, and repository features obtainer 104. Further, the command controller 101 sends a command, such as a request command or a response command, to the MFP 200 or at least one of the repositories 300, via the network 400. In addition to receiving or sending the command, the command controller 101 may function as an interface for inputting or outputting data to or from the management device 100.

The repository features obtainer 104 obtains information regarding the features of the repositories 300 ("repository features information"), and stores the repository features information in the repository features database 106.

The repository rule manager 102 generates a repository rule and stores it in the repository rule database 105. The repository rule manager 102 may further edit or update the repository rule at any time. In this exemplary embodiment, any kind of operation applied to a repository rule, such as generating, editing, or updating, may be referred collectively as managing a repository rule.

Further, in this exemplary embodiment, the repository rule is managed based on ISMS level information stored in the repository rule database 105, and the repository features information stored in the repository features database 106. The ISMS level information, which indicates the features of a repository required for satisfying a specific ISMS level, is previously determined by a user or an administrator in compliance with the ISMS.

The repository rule applier 103 obtains a security level of input data, and selects one of the repositories 300, which is suitable for storing the input data, by applying the repository rule. The repository rule applier 103 then notifies the MFP 200 of the selected one of the repositories 300 via the command controller 101.

Figure 3:
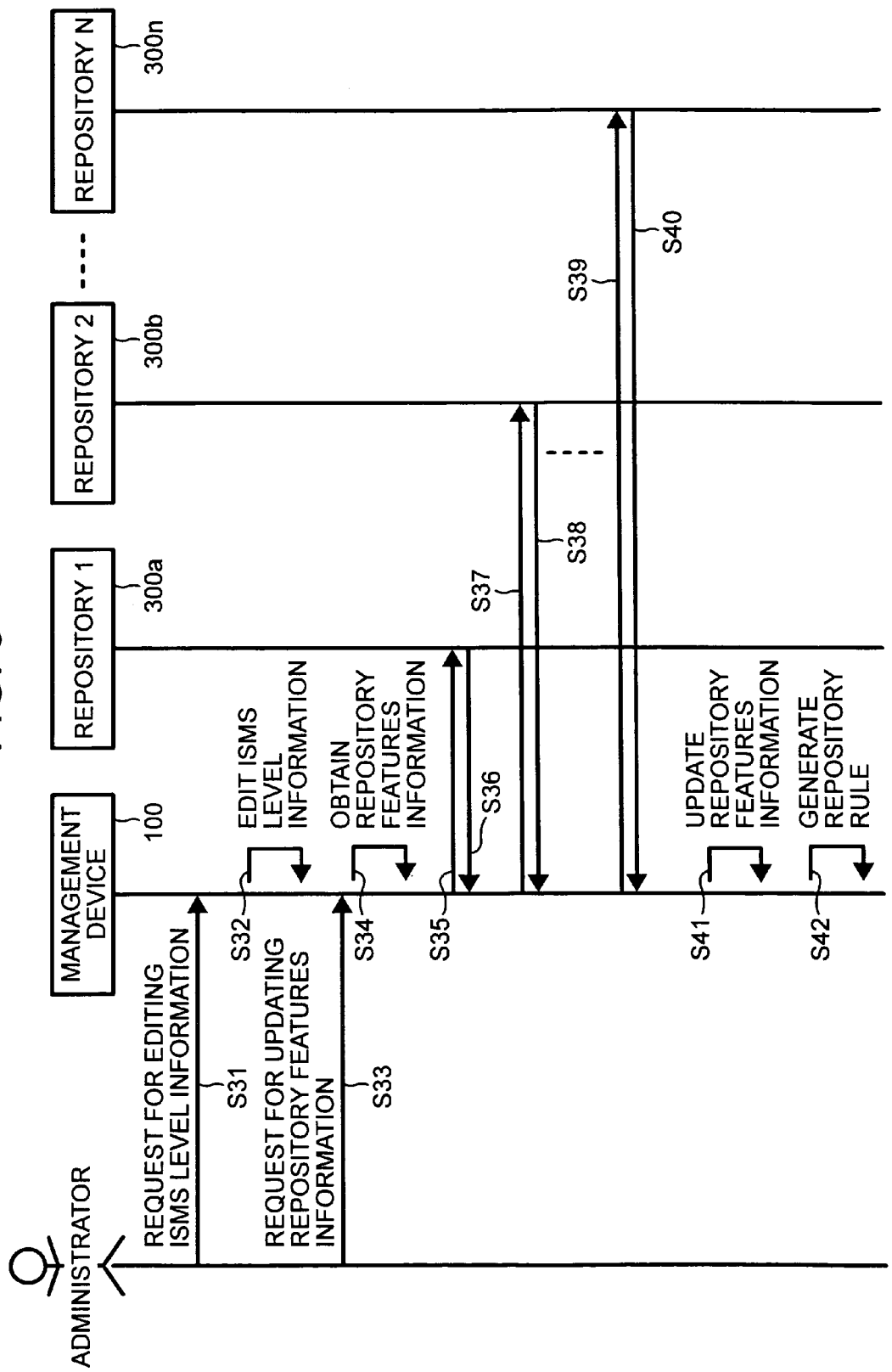
FIG. 3 shows a schematic diagram illustrating an operation for managing a repository rule, performed by the repository management device of FIG. 2, according to an exemplary embodiment.

Referring now to FIG. 3, an operation of managing a repository rule is explained according to an exemplary embodiment. The steps illustrated in the exemplary embodiment of FIG. 3 are performed by an administrator of the system 1000. However, they may be performed by a user if the ISMS allows the user to manage the repository rule. Further, the administrator or the user may perform the steps of FIG. 3 via the MFP 200 or any other device connected to the management device 100.

In Step S31, the administrator sends a request command to the management device 100 for editing ISMS level information.

In this exemplary embodiment, the ISMS level information is stored in the repository rule database 105, for example, as an ISMS level table shown in FIG. 4. The table of FIG. 4 stores a set of features of a repository required for satisfying a specific ISMS level. Referring to FIG. 4, the stored features include an access control feature, encryption feature, document protection feature, watermark feature, secondary repository feature, and auxiliary power feature. However, other features may be listed in the table of FIG. 4 as long as such other features are determined in compliance with the ISMS.

The access control feature provides a function of restricting a user's operation on data. The user's operation can include accessing, viewing, editing, deleting, etc. In this exemplary embodiment, the access control feature includes authentication by username and password. The encryption feature provides a function of encrypting data to be stored, and decrypting the encrypted data when accessed by an authorized user, for example, using an encryption module.

The document protection feature provides a function of verifying a printed document, for example, by embedding a signature using an embedded pattern printing technology. The watermark feature provides a function of verifying data, by adding a digital watermark such as a signature to the data.

The secondary repository feature provides a function of supplying another repository when a repository in use is not in operation. The auxiliary power feature provides a function of supplying a power to a repository when a main power source is not in operation, such as at the time of power supply shortage.

As shown in FIG. 4, one or more of the above-described features may be assigned one or more of the ISMS levels, according to the security level required for each of the ISMS levels. For the confidentiality level 1, none of the features is required. For the confidentiality level 2, the access control feature is required. For the confidentiality level 3, the access control feature and the encryption feature are required. For the integrity level 1, none of the features is required. For the integrity level 2, the document protection feature is required. For the integrity level 3, the document protection feature and the watermark feature are required. For the availability level 1, none of the features is required. For the availability level 2, the secondary repository feature is required. For the availability level 3, the secondary repository and the auxiliary power feature are required.

Referring back to FIG. 3, in Step S32, the management device 100 receives the request command for editing the ISMS level information through the command controller 101, and sends it to the repository rule manager 102. The repository rule manager 102 edits the ISMS level information based on the request command. In this exemplary embodiment, editing can include modifying, adding, or deleting data stored in the ISMS level table of FIG. 4. In one example, the repository rule manager 102 may change a set of features required for each of the ISMS levels, by adding a feature to the table 4 or deleting a feature from the table 4.

Once the ISMS level information is edited, in Step S33, the administrator sends a request command to the management device 100 for updating the repository features information. In this exemplary embodiment, the repository features information may be stored as a repository features table shown in FIG. 5.

The table of FIG. 5 lists a set of features supported by each of the repositories 300. In FIG. 5, the feature supported by the corresponding one of the repositories 300 is indicated by a circle. For example, according to the table of FIG. 5, the first repository 300a ("repository 1") supports the access control feature, encryption feature, document protection feature, secondary repository feature, and a data recovery feature. The data recovery feature provides a function of restoring data, which may be lost, using backup data created based on the data.

In addition to the features shown in FIG. 5, other features may be included in the repository features table as long as such other feature are supported by at least one of the repositories 300. For example, if one of the repositories 300 has an encryption communication feature, which provides a function of allowing encryption communication, such as HTTPS, the encryption communication may be included in the repository features table.

In Step S34, the management device 100 receives the request command for updating the repository features information through the command controller 101, and sends it to the repository features obtainer 104. The repository features obtainer 104 sends a request command to each one of the repositories 300 to obtain the repository features information specific to the one of the repositories 300.

For example, in Step S35, the repository features obtainer 104 sends a request command to the first repository 300a. In Step S36, the first repository 300a sends repository features information indicating the features supported by the first repository 300a.

Similarly, in Step S37, the repository features obtainer 104 sends a request command to the second repository 300b. In Step S38, the second repository 300b sends repository features information indicating the features supported by the second repository 300b.

Similarly, in Step S39, the repository features obtained 104 sends a request command to the Nth repository 300n. In Step S40, the Nth repository 300n sends repository features information indicating the features supported by the Nth repository 300n.

In Step S41, based on the repository features information obtained from the repositories 300a through 300n, the repository features obtainer 104 updates the repository features information, i.e., the repository features table of FIG. 5, stored in the repository features database 106.

In Step S42, using the ISMS level information and the repository features information, the repository rule manager 102 manages a repository rule. In this exemplary embodiment, the repository rule manager 102 may generate a repository rule table shown in FIG. 6, using the ISMS level table of FIG. 4 and the repository features table of FIG. 5.

For example, to generate the repository rule table of FIG. 6, the repository rule manager 102 determines that the access control feature and the encryption feature are the required features of the confidentiality level 3, by referring to the ISMS level table of FIG. 4. The repository rule manager 102 determines whether each of the repositories 300 has the required features of the confidentiality level 3, by referring to the repository features table of FIG. 5. The repository rule manager 102 then determines which of the repositories 300 can satisfy the confidentiality level 3. As shown in FIG. 6, the first repository 300a ("repository 1"), the third repository 300c ("repository 3"), and the fourth repository 300d ("repository 4") each satisfies the confidentiality level 3.

In a similar manner, the repository rule manager 102 determines that the document protection feature and the watermark feature are the required features of the integrity level 3, by referring to the ISMS level table of FIG. 4. The repository rule manager 102 determines whether each of the repositories 300 has the required features of the integrity level 3, by referring to the repository features table of FIG. 5. The repository rule manager 102 then determines which of the repositories 300 can satisfy the integrity level 3. As shown in FIG. 6, the fourth repository 300d ("repository 4") satisfies the integrity level 3.

In a similar manner, the repository rule manager 102 determines that the secondary repository feature and the auxiliary power feature are the required features of the availability level 3, by referring to the ISMS level table of FIG. 4. The repository rule manager 102 determines whether each of the repositories 300 has the required features of the availability level 3, by referring to the repository features table of FIG. 5. The repository rule manager 102 then determines which of the repositories 300 can satisfy the availability level 3. As shown in FIG. 6, the fourth repository 300d ("repository 4") satisfies the availability level 3.

In this way, a highest ISMS level that can be supported (referred to as the "repository ISMS level") may be determined for each of the repositories 300.

Figure 7:
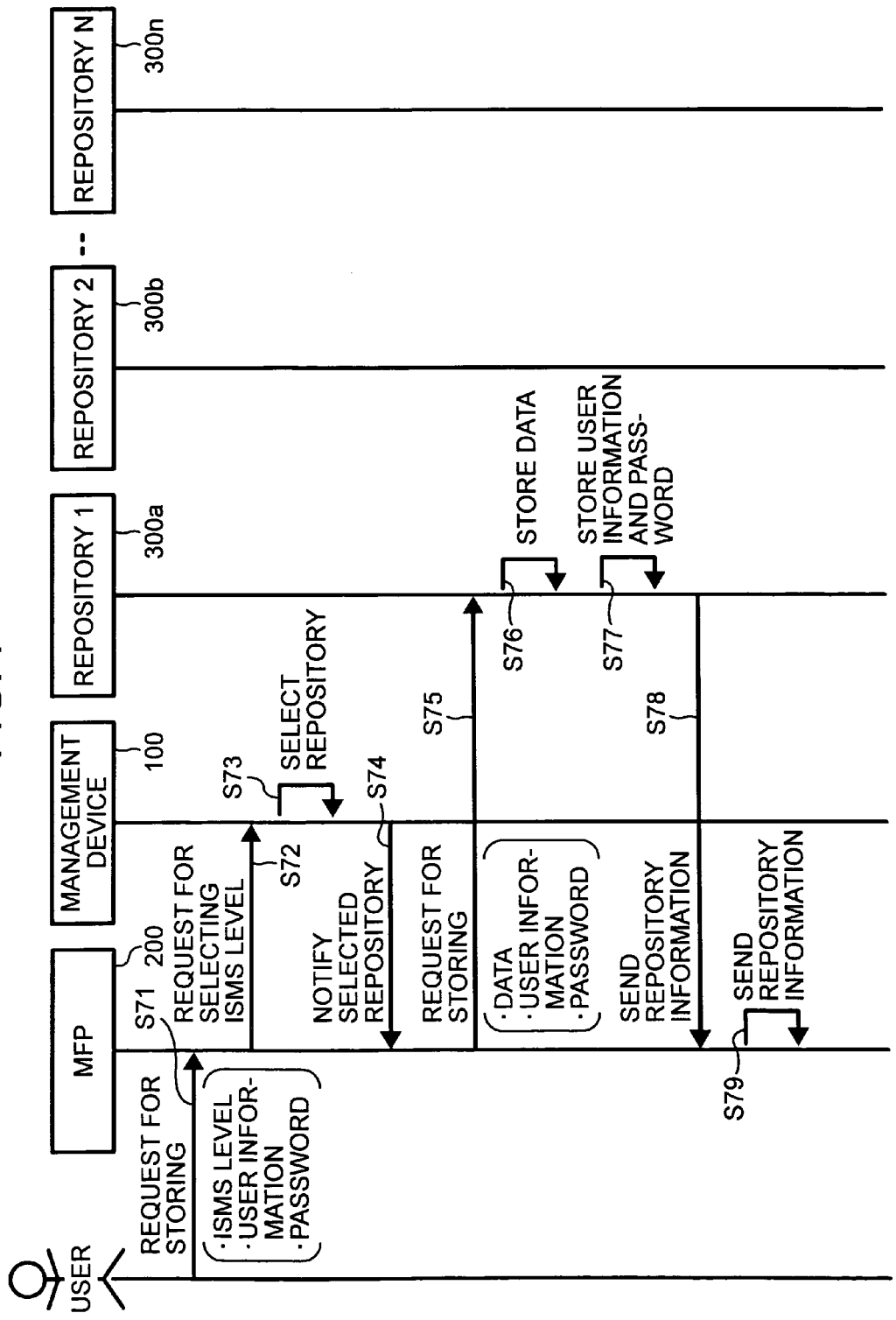
FIG. 7 shows a schematic diagram illustrating an operation for applying a repository rule, performed by the repository management device of FIG. 2, according to an exemplary embodiment.

Referring now to FIG. 7, an operation of applying the repository rule is explained according to an exemplary embodiment of the present disclosure. The steps illustrated in the exemplary embodiment of FIG. 7 are performed by a user of the system 1000. However, they may be performed by an administrator if the ISMS allows the administrator to apply the repository rule. Further, the user or the administrator may perform the steps of FIG. 7 via any device connected to the management device 100.

In Step S71, the user provides input data to the MFP 200 together with a request command for storing the input data in one of the repositories 300 in compliance with the ISMS. In this exemplary embodiment, the input data may be in the form of a printed document, which may be scanned into data form using the scanning function of the MFP 200. Alternatively, the input data may be provided in electronic form.

Figure 8:
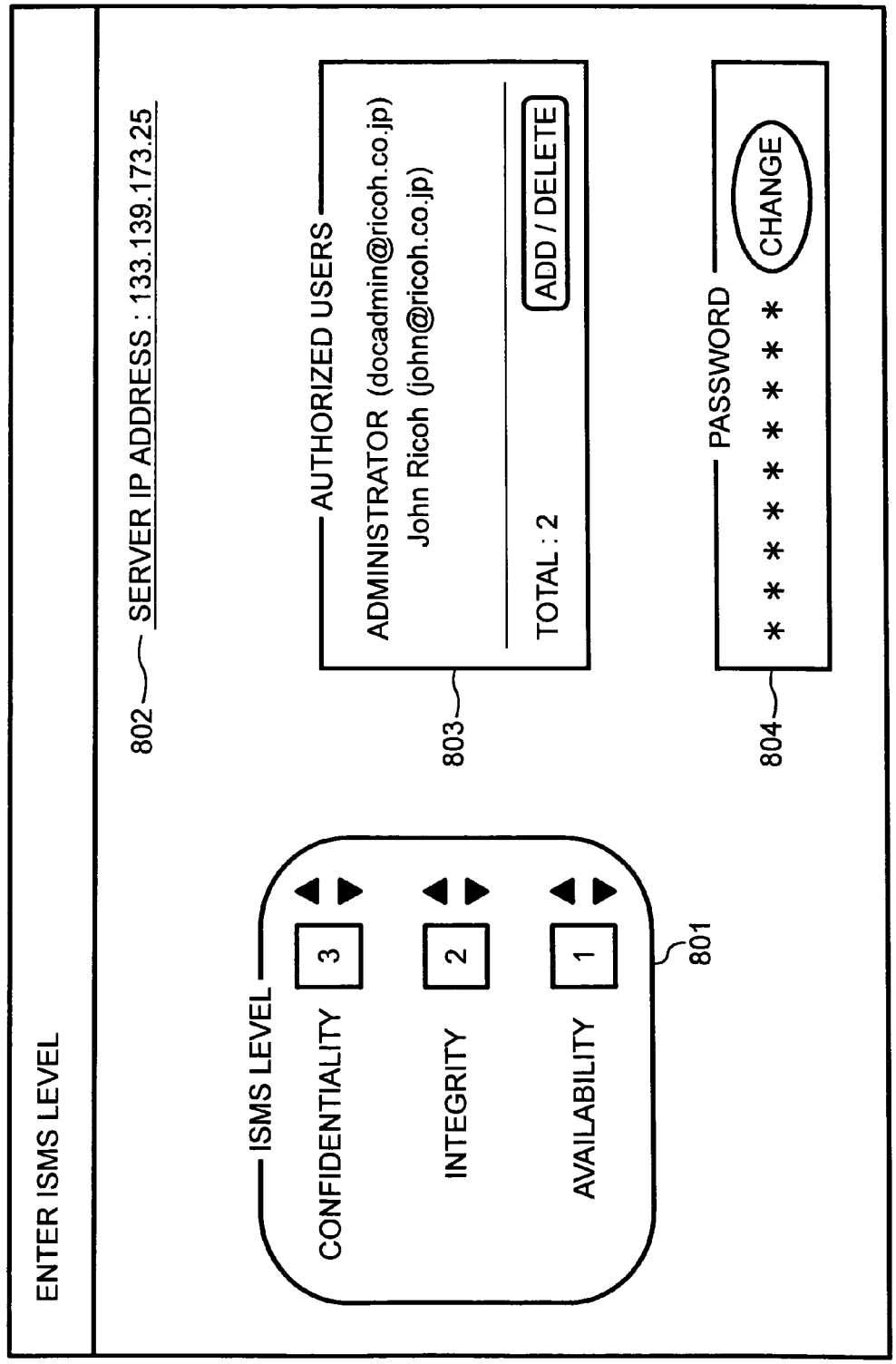
FIG. 8 shows a graphical illustration of an exemplary display for requesting information necessary for storing data, according to an exemplary embodiment.

Upon receiving the request command, the MFP 200 displays a display on the operation panel, which requests the user to input information necessary for storing the input data in compliance with the ISMS, as illustrated in FIG. 8.

The display of FIG. 8 includes an ISMS level section 801, management device section 802, user information section 803, and password section 804.

The ISMS level section 801 is provided for inputting the ISMS level of the input data, including the confidentiality level, integrity level, and availability level. The management device section 802 displays information identifying the management device 100, such as an IP address of the management device 100.

The user information section 803 is provided for inputting user information regarding a user who is authorized to access the input data, such as a user name or a user's email address. For example, the user may select the "ADD/DELETE" button on the user information section 803 to cause the management device 100 to display a keyboard, a list of registered users, a list of email addresses of the registered users, etc. Using the keyboard or the list, the user may input the user information. In this exemplary embodiment, the administrator is automatically listed as the authorized user. However, another user may be listed as long as it is compliant with the ISMS.

The password section 804 is provided for inputting a password to be used for accessing the input data. The password may be changed by selecting the "CHANGE" button on the display at any time.

After receiving information necessary for storing the input data, including the ISMS level of the input data, the user information, and the password, in Step S72, the MFP 200 sends a request command to the management device 100 for selecting one of the repositories 300 according to the ISMS level of the input data.

In Step S73, the management device 100 receives the request command for selecting from the MFP 200 through the command controller 101, and sends it to the repository rule applier 103. At this time, the ISMS level of the input data is provided together with the request command. The repository rule applier 103 selects one of the repositories 300 by referring to the repository rule stored in the repository rule database 105, such as the repository rule table of FIG. 6.

For example, the repository rule applier 103 selects at least one of the repositories 300, having a repository ISMS level equal to or higher than the ISMS level of the input data, as a candidate repository. If more than one repository is selected as the candidate repository, the repository rule applier 103 further selects one from the candidate repositories, having a lowest repository ISMS level, as a repository for storing the input data.

In this exemplary embodiment, the input data is assigned with the ISMS level having the confidentiality level 3, integrity level 2, and availability level 1, as shown in FIG. 8. Referring to FIG. 6, the first repository 300a ("repository 1") and the fourth repository 300d ("repository 4") are first selected as candidate repositories. The first repository 300a having the repository ISMS level lower than the repository ISMS level of the fourth repository 300d is then selected as a repository for storing the input data.

In Step S74, the repository rule applier 103 sends information regarding the selected repository to the MFP 200 via the command controller 101, as a response to the request command of Step S72. In this exemplary embodiment, information indicating that the first repository 300a has been selected is notified. In this step, if none of the repositories 300 is elected in the previous step, the repository rule applier 103 may send an error message indicating that none of the repositories 300 is selected.

In Step S75, the MFP 200 sends a request command to the selected repository, i.e., the first repository 300a, for storing the input data. At the same time, the MFP 200 sends the input data, the user information, and the password to the first repository 300a.

In Step S76, the selected repository, i.e., the first repository 300a, stores the input data after applying various processing to the input data in compliance with the ISMS. In this exemplary embodiment, the first repository 300a applies various processing according to the encryption feature, document protection feature, and data recovery feature.

Further, in Step S77, the first repository 300a stores the user information and the password in a corresponding manner, which may be used by the access control feature. This step is performed when the access control feature is required.

In Step S78, the repository 300a sends repository information to the MFP 200. The repository information indicates information necessary for the user to access the input data, such as location of the input data, which may be expressed as, for example, a URL (Universal Resource Locator).

In Step S79, the MFP 200 sends the repository information to the user. In one example, the MFP 200 may send the repository information to an email address of the user, which is input to the user information section 803 in Step S71. In another example, the MFP 200 may display the repository information on the operational panel.

Figure 9:
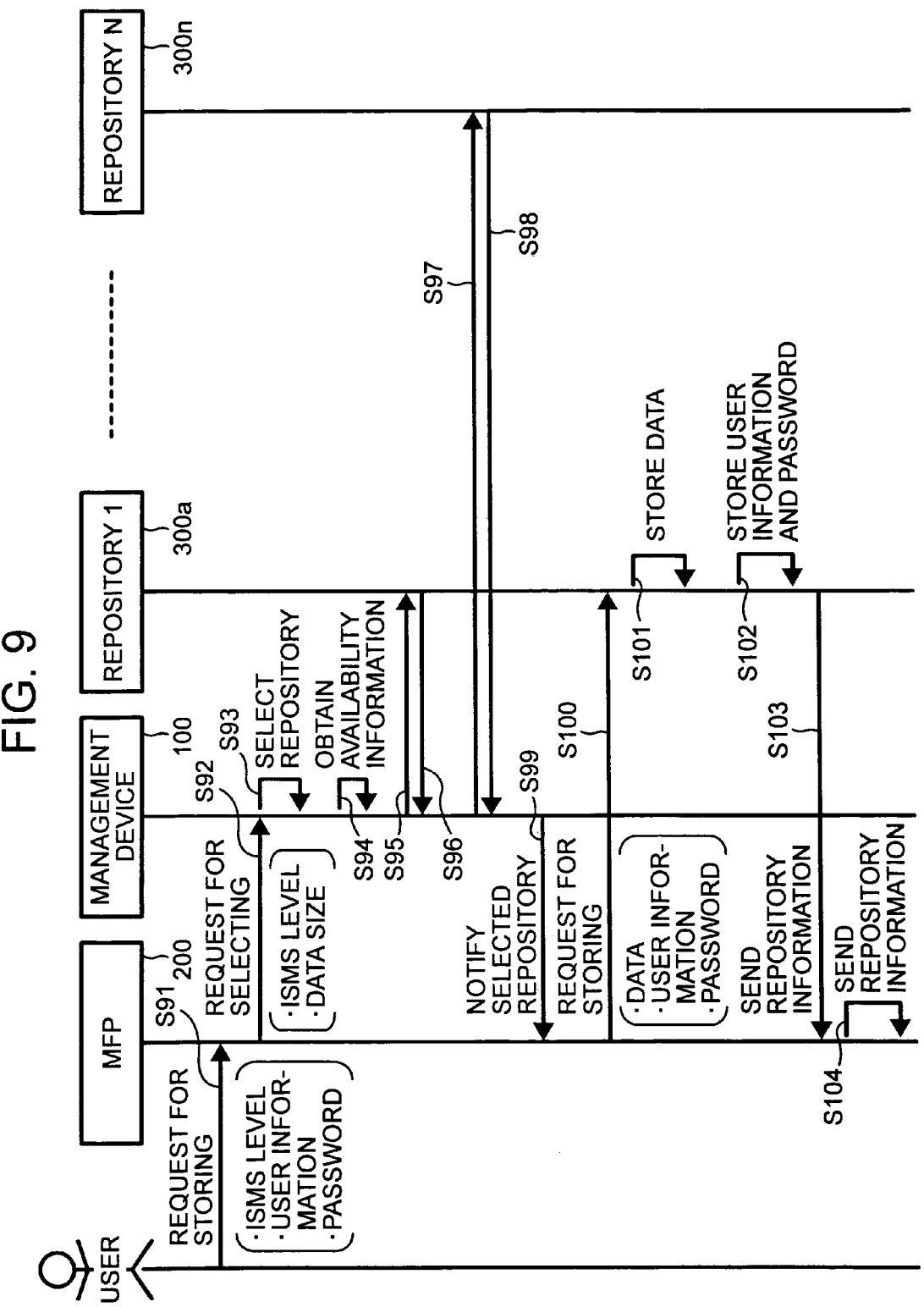
FIG. 9 shows a schematic diagram illustrating an operation for applying a repository rule, performed by the repository management device of FIG. 2, according to another exemplary embodiment.

Referring now to FIG. 9, an operation of applying the repository rule is explained according to another exemplary embodiment. The steps illustrated in the exemplary embodiment of FIG. 9 are performed by a user of the system 1000. However, they may be performed by an administrator if the ISMS allows the administrator to apply the repository rule. Further, the user or the administrator may perform the steps of FIG. 9 via any device connected to the management device 100.

In Step S91, the user provides input data and a request command for storing the input data in one of the repositories 300, in a substantially similar manner as described above referring to Step S71 of FIG. 7. At this time, the ISMS level, user information, and password are input to the MFP 200.

In Step S92, the MFP 200 sends a request command to the management device 100 for selecting one of the repositories 300 according to the ISMS level and a data size of the input data.

In Step S93, the management device 100 receives the request command from the MFP 200 through the command controller 101, and sends it to the repository rule applier 103. At this time, the ISMS level and the data size of the input data are provided together with the request command. The repository rule applier 103 selects one of the repositories 300 by referring to the repository rule and availability information of the repositories 300. The availability information indicates an available data space of a repository.

For example, the repository rule applier 103 selects at least one of the repositories 300, having a repository ISMS level equal to or higher than the ISMS level of the input data, as a candidate repository. If more than one repository is selected as the candidate repository, the repository rule applier 103 further selects one from the candidate repositories, which has a large amount of space available for storing the input data, by referring to the availability information of the candidate repositories.

In this exemplary embodiment, the input data is assigned with the ISMS level having the confidentiality level 3, integrity level 2, and availability level 1, as shown in FIG. 8. Referring to FIG. 6, the first repository 300a ("repository 1") and the fourth repository 300d ("repository 4") are first selected as candidate repositories. To determine which of the first and fourth repositories 300a and 300d has more space available, the availability information may be obtained in Step S94.

For example, in Step S95, the repository rule applier 103 sends a request command to the first repository 300a through the command controller 101. In Step S96, the first repository 300a sends availability information indicating the space available for data storage.

Similarly, in Step S97, the repository rule applier 103 sends a request command to the fourth repository 300d through the command controller 101. In Step S98, the fourth repository 300n sends availability information indicating the space available for data storage.

Assuming that the first repository 300a has a larger available space than the available space of the fourth repository 300d, the repository rule applier 103 selects the first repository 300a as a repository for storing the input data.

Further, the repository rule applier 103 may determine whether the available space of the first repository 300a is equal to or larger than the data size of the data received in Step S93. The first repository 300a is selected only when it has a space equal to or larger than the data size of the data.

In Step S99, the repository rule applier 103 sends information regarding the selected repository to the MFP 200 in a substantially similar manner as described referring to Step S74 of FIG. 7. In this step, if none of the repositories 300 is selected in the previous step, the repository rule applier 103 may send an error message indicating that none of the repositories 300 is selected.

In Step S100, the MFP 200 sends a request command to the selected repository for storing the input data, in a substantially similar manner referring to Step S75 of FIG. 7. At the same time, the input data is sent to the selected repository.

In Step S101, the selected repository stores the input data after performing various processing on the input data, in a substantially similar manner as described referring to Step S76 of FIG. 7.

In Step S102, the selected repository may store the user information and the password in a corresponding manner, which may be used by the access control feature.

In Step S103, the selected repository sends repository information to the MFP 200, in a substantially similar manner as described referring to Step S78 of FIG. 7.

In Step S104, the MFP 200 sends the repository information to the user, in a substantially similar manner as described referring to Step S79 of FIG. 7.

Any one of the operations for applying the repository rule shown in FIGS. 7 and 9 may be performed in various other ways.

For example, instead of having the user input the ISMS level, the management device 100 may automatically assign a specific ISMS level to input data in compliance with the ISMS, for example, according to the user information provided by the user.

Further, in the above-described examples, the management device 100 selects one of the candidate repositories according to a predetermined selection rule, such as, based on the repository ISMS level or the availability information. Alternatively, the management device 100 may allow a user to select one of the candidate repositories according to a user's preference, by requesting the user to input user preference information indicating the user's preference.

Furthermore, the information management system 1000 of FIG. 1 may be implemented in various other ways. For example, the functions of the MFP 200 and the management device 100 may be performed by any number of devices or any kind of devices. For example, the display shown in FIG. 8 may be displayed on a display device, such as a liquid crystal display provided on the network 400.

Figure 10:
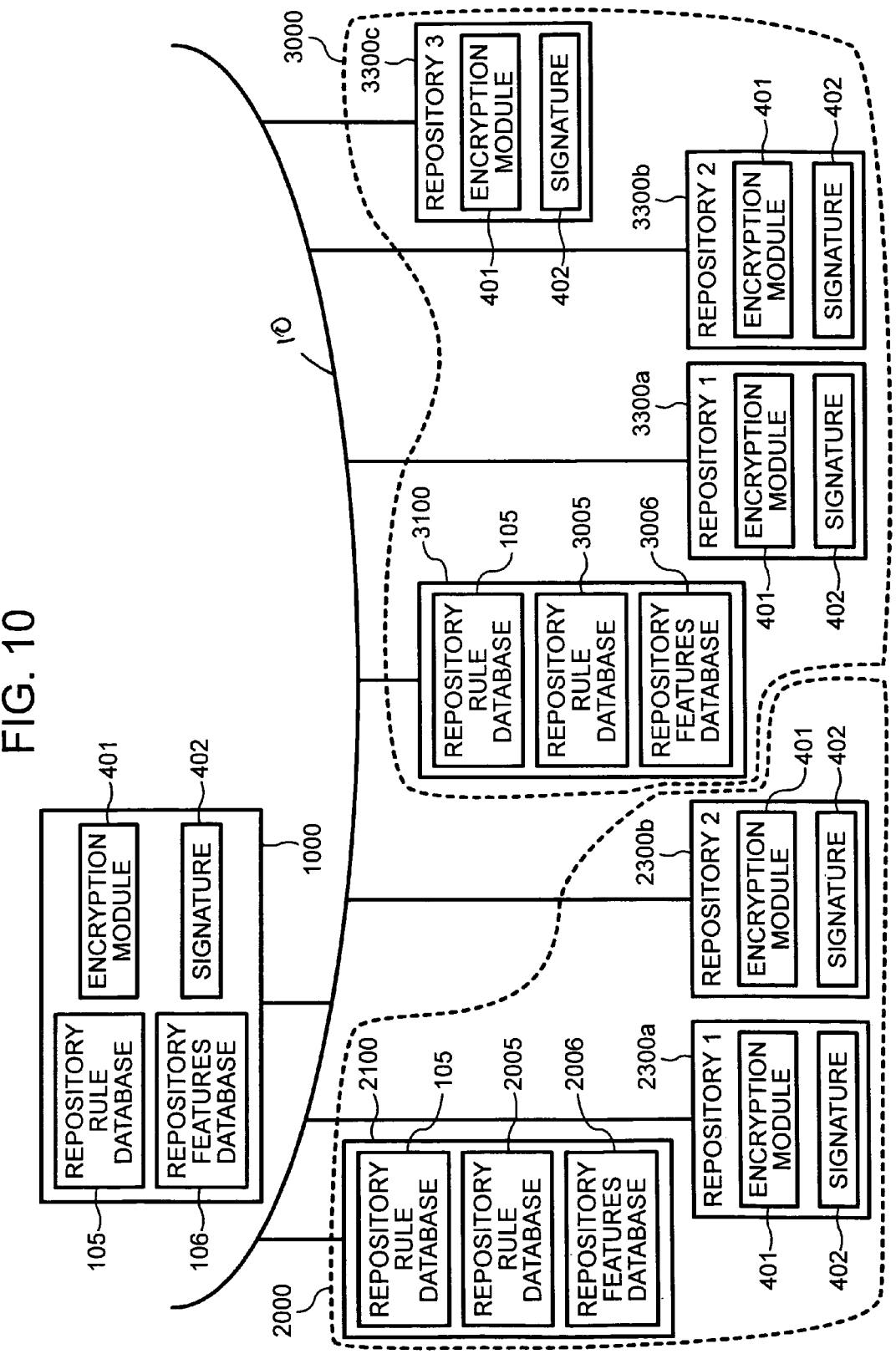
FIG. 10 shows a schematic block diagram illustrating an information management system according to another exemplary embodiment of the present disclosure.

Furthermore, the information management system 1000 of FIG. 1 may be combined with one or more information management systems, as illustrated in FIG. 10, for example.

In FIG. 10, the information management system 1000 corresponds to a system of a parent company. The information management system 1000 is connected via a network 10 to a plurality of systems each corresponding to a respective subsidiary company. In this exemplary embodiment, the information management system 1000 is connected to the information management system 2000 operated by a subsidiary company A, and to the information management system 3000 operated by a subsidiary company B.

In FIG. 10, the information management system 1000 mainly includes the repository rule database 105 storing the parent company's ISMS level information, the repository features database 106 storing the parent company's repository features information, an encryption module 401 providing the function of the encryption feature, and a signature 402 corresponding to a signature used by the document protection feature or the watermark feature. Although not shown in FIG. 10, the information management system 1000 is provided with other devices or functions described above.

The information management system 2000 mainly includes a management device 2100, and two repositories including a first repository 2300a and a second repository 2300b.

The management device 2100 has a structure substantially similar to the structure of the management device 100 of FIG. 2. However, the management device 2100 stores information different from the information stored in the management device 100. In this exemplary embodiment, the subsidiary company A is required to be in compliance with the ISMS of the parent company and an ISMS of a partner company. Accordingly, the management device 2100 includes the repository rule database 105 storing the ISMS level information of the parent company, and a partner repository rule database 2005 storing the ISMS level information of the partner company. Further, the management device 2100 includes a repository features database 2006 storing repository features information of the first and second repositories 2300a and 2300b. In this exemplary embodiment, the ISMS level information of the parent company or the partner company cannot be managed by the management device 2100.

Each of the repositories 2300a and 2300b is provided with the encryption module 401 and the signature 402 of the parent company, which may be provided from the system 1000 via the network 10. Thus, the encryption module 401 or the signature 402 cannot be modified by the management device 2100. In addition to the encryption module 401 and the signature 402, the repository 2300a or 2300b may be provided with any other modules or data corresponding to the features that help to improve the security level.

The information management system 3000 mainly includes a management device 3100, and three repositories including a first repository 3300a, a second repository 3300b, and a third repository 3300c.

The management device 3100 has a structure substantially similar to the structure of the management device 100 of FIG. 2. However, the management device 3100 stores information different from the information stored in the management device 100. In this exemplary embodiment, the subsidiary company B is required to be in compliance with the ISMS of the parent company and an ISMS of the subsidiary company B. Accordingly, the management device 3100 includes the repository rule database 105 storing the ISMS level information of the parent company, and a repository rule database 3005 storing the ISMS level information of the company B. Further, the management device 3100 includes a repository features database 3006 storing repository features information of the first, second, and third repositories 3300a, 3300b, and 3300c. In this exemplary embodiment, the ISMS level information of the parent company cannot be managed by the management device 3100.

Each of the repositories 3300a, 3300b and 3300c is provided with the encryption module 401 and the signature 402 of the parent company, which may be provided from the system 1000 via the network 10. Thus, the encryption module 401 or the signature 401 cannot be modified by the management device 3100. In addition to the encryption module 401 and the signature 402, any one of the repositories 3300a, 3300b, and 3300c may be provided with any other modules or data corresponding to the features that help to improve the security level. For example, any one of the repositories 3300a, 3300b, and 3300c may be provided with a signature of the company B for applying the document protection feature or the watermark feature.

As shown in FIG. 10, the company A may be required to combine the ISMS level information of the parent company and the ISMS level information of the partner company to be in compliance with the ISMS of the parent company and the partner company. In another example, the company B may be required to combine the ISMS level information of the parent company and the ISMS level information of the company B to be in compliance with the ISMS of the parent company and the company B.

Referring now to FIGS. 4, 11, and 12, an operation of combining different kinds of ISMS level information, performed by the management device 2100, is explained according to an exemplary embodiment of the present disclosure.

The ISMS level information of the parent company may be stored in the repository rule database 105 as the ISMS level table of FIG. 4. The ISMS level information of the partner company may be stored in the repository rule database 2005 as an ISMS level table of FIG. 11. By logically adding the values in the ISMS level table of FIG. 4 and the values in the ISMS level table of FIG. 11, the management device 2100 generates an ISMS level table of FIG. 12.

For example, the management device 2100 determines that none of the features is required for the confidentiality level 1, by referring to the ISMS level table of FIG. 4 and the ISMS level table of FIG. 11. Accordingly, the management device 2100 determines that none of the feature is required for the confidentiality level 1, as shown in FIG. 12.

In a similar manner, the management device 2100 determines that the access control feature is required for the confidentiality level 2 according to the ISMS of the parent company, by referring to the ISMS level table of FIG. 4. The management device 2100 further determines that the encryption feature is required for the confidentiality level 2 according to the ISMS of the partner company, by referring to the ISMS level table of FIG. 11. Accordingly, the management device 2100 determines that the access control and encryption features are required for the confidentiality level 2, as shown in FIG. 12.

In a similar manner, the management device 2100 determines that the access control feature and encryption feature are required for the confidentiality level 3, by referring to the ISMS level table of FIG. 4 and the ISMS level table of FIG. 11. Accordingly, the management device 2100 determines that the access control and encryption features are required for the confidentiality level 2, as shown in FIG. 12.

Using the ISMS level table of FIG. 12 and the repository features information stored in the repository features database 2006, the management device 2100 may further generate a generation rule table in a substantially similar manner as described referring to Step S42 of FIG. 3.

Figure 13A:
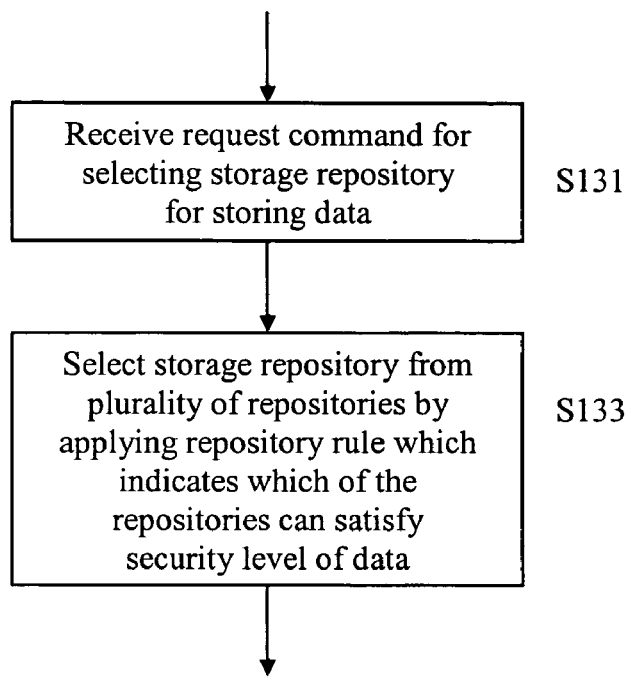
FIG. 13a shows a flow chart for a method for managing storage of data to one or more of a plurality of repositories in an information processing system, according to an exemplary embodiment.

A method which can be performed by a repository management device for managing storage of data to one or more of a plurality of repositories in an information processing system (each repository having a set of features capable of improving and maintaining security of the information processing system), according to one example, is discussed below with reference to FIG. 13a. The basic steps of the method include (a) receiving a request command for selecting a storage repository for storing data (step S131), and (b) selecting the storage repository from the plurality of repositories by applying a repository rule which indicates which of the plurality of repositories can satisfy a security level of the data (step S133).

Figure 13B:
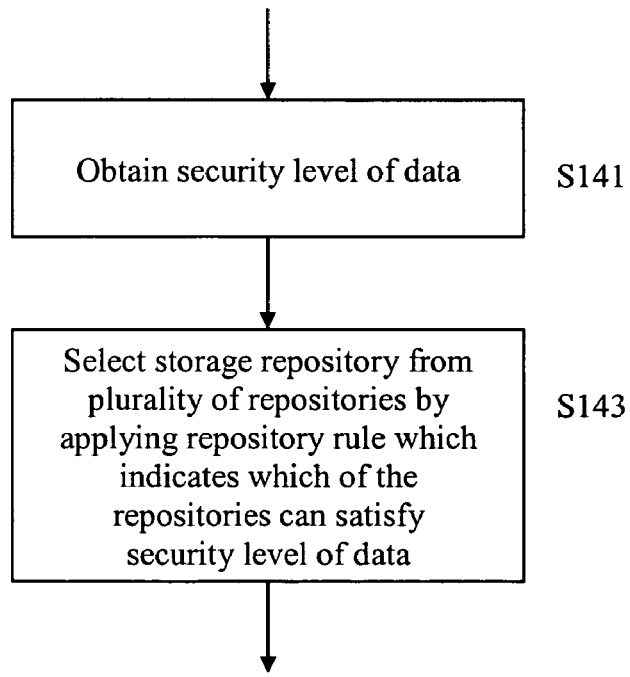
FIG. 13b shows a flow chart for a method for managing storage of data to one or more of a plurality of repositories in an information processing system, according to another exemplary embodiment.

A method, according to another exemplary embodiment, for managing storage of data to one or more of a plurality of repositories in an information processing system, is discussed below with reference to FIG. 13b. The basic steps of the method of FIG. 13b include (i) obtaining a security level of data to be stored, and (ii) selecting a storage repository for storing the data from the plurality of repositories by applying a repository rule, the repository rule indicating which of the plurality of repositories can satisfy the security level of the data.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

Further, the present disclosure may be applied to kinds of security systems other than the ISMS.

Furthermore any one of the above-described and other operations of the present disclosure may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc. Alternatively, any portion of the computer program may be downloaded from a storage device on the network 400 and/or transmitted as one or more segments through the network.

Furthermore, any one of the above-described and other methods of the present disclosure may be implemented by ASIC, prepared by interconnecting an appropriate network of conventional component circuits or by a combination thereof with one or more conventional general purpose microprocessors and/or signal processors programmed accordingly.

This patent application is based on and claims priority to Japanese patent application, No. JPAP2004-247055 filed on Aug. 26, 2004, in the Japanese Patent Office, the entire contents of which are incorporated by reference herein.

What is claimed is:

1. A repository management device connected to a plurality of repositories, the device comprising:
    a repository rule database configured to store first security level information indicating a set of features required for a repository to satisfy a specific security level previously determined by a first group of users;
    a repository features obtainer configured to obtain repository feature information from each one of the plurality of repositories, the repository feature information indicating whether at least one of the features in the set indicated by the first security level information is supported by each one of the plurality of repositories;
    a repository features database configured to store the repository features information obtained by the repository features obtainer;
    a repository rule manager configured to generate a repository rule indicating which one of the plurality of repositories can satisfy the specific security level previously determined by the first group of users using the repository features information stored in the repository features database and the first security level information stored in the repository rule database, and to store the repository rule in the repository rule database;
    a command controller configured to receive a request command for selecting a storage repository for storing input data; and
    a repository rule applier configured to obtain a security level of the input data and to select one of the plurality of repositories using the repository rule stored in the repository rule database as a storage repository to store the input data.

2. The device of claim 1, wherein the specific security level previously determined by the first group of users is classified into a plurality of types of levels at least including:
    a confidentiality level indicating a security level for maintaining and improving confidentiality of the data;
    an integrity level indicating a security level for maintaining and improving integrity of the data; and
    an availability level indicating a security level for maintaining and improving availability of data.

3. The device of claim 1, further comprising:
    an additional repository rule database to store second security level in formation indicating a set of features required for a repository to satisfy a specific security level previously determined by a second group of users different from the first group of users, wherein:
    the repository rule manager is further configured to logically add a value of the first security level information obtained from the repository rule database and a value of the second security level information obtained from the additional repository rule database to generate combined security level information indicating at least one of the specific security level previously set by the first group of users and the specific security level previously set by the second group of users, and
    the repository rule manager is further configured to generate a combined repository rule indicating which one of the plurality of repositories can satisfy at least one of the specific security level previously set by the first group of users and the specific security level previously set by the second group of users.

4. The device of claim 2, wherein the repository rule includes:
    for each of the plurality of repositories, a corresponding repository security level indicating a highest security level that can be supported by the repository for each one of the plurality of types of levels.

5. The device of claim 4, wherein the repository rule manager is configured to:
    obtain the repository security level of each of the plurality of repositories from the repository rule; and
    select one or more repositories as candidate repositories from the plurality of repositories, the repository security level of each candidate repository being equal to or higher than the security level of the input data,
    wherein the storage repository is selected from the candidate repositories.

6. The device of claim 5, wherein the repository rule manager is configured to select a repository having a lowest repository security level from the candidate repositories as the storage repository.

7. The device of claim 5, wherein the repository rule manager is configured to:
    obtain availability information indicating an available data space of each of the candidate repositories; and
    select a repository having a largest available data space from the candidate repositories as the storage repository.

8. The device of claim 5, wherein the repository rule manager is configured to:
    obtain availability information indicating an available data space of each of the candidate repositories;
    obtain a size of the input data; and
    select a repository having a largest available data space as the storage repository, when the largest available data space is equal to or larger than the size of the data.

9. The device of claim 5, wherein the command controller is configured to:
    obtain user information input by a user who belongs to the first group of users; and
    assign the security level of the input data according to the user information.

10. The device of claim 1, wherein the repository rule generated by the repository rule manager indicates one or more of the repositories that can satisfy a security level of the input data.

11. The device of claim 1, wherein the repository rule manager updates the repository rule based on updates to at least one of said repository features information and said first security level information.

12. The device of claim 3, wherein
the repository rule manager logically adds a first value from the first security level information indicating a first set of features required to satisfy a particular security level, and a second value from the second security level information indicating a second set of features required to satisfy the particular security level, to generate combined security level information indicating a combined set of features required for a repository to satisfy the particular security level, and
the repository rule manager generates a combined repository rule indicating which one of the plurality of repositories can satisfy said specified security level.

13. An information processing system, comprising:
a plurality of repositories each having a set of features capable of improving and maintaining security of the information processing system; and
a repository management device connected to the plurality of repositories and configured to manage storage of data to one or more of the plurality of repositories, die repository management device comprising:
a repository rule database configured to store first security level information indicating a set of features required for a repository to satisfy a specific security level previously set by a first group of users;
a repository features obtainer configured to obtain repository feature information from each one of the plurality of repositories, the repository feature information indicating whether at least one of the set of features indicated by the first security level information is supported by each one of the plurality of repositories;
a repository features database configured to store the repository features information obtained by the repository features obtainer;
a repository rule manager configured to generate a repository rule indicating which one of the plurality of repositories can satisfy the specific security level previously determined by the first group of users using the repository features information stored in the repository features database and the security level information stored in the repository rule database, and to store the repository rule in the repository rule database;
a command controller configured to receive a request command for selecting a storage repository for storing input data; and
a repository rule applier configured to obtain a security level of the input data and to select one of the plurality of repositories using the repository rule stored in the repository rule database as a storage repository to store the input data.

14. The system of claim 13, further comprising:
a multifunctional apparatus connected to the repository management device and configured to send the request command for selecting a storage repository for storing input data and to notify the security level of the input data.

15. The system of claim 14, wherein the specific security level previously determined by the first group of users is classified into a plurality of types of levels at least including:
a confidentiality level indicating a security level for maintaining and improving confidentiality of the data;
an integrity level indicating a security level for maintaining and improving integrity of the data; and
an availability level indicating a security level for maintaining and improving availability of data.

16. The system of claim 14, wherein the repository rule includes:
for each of the plurality of repositories, a repository security level of the repository indicating a highest security level that can be supported by the repository for each one of the plurality of types of levels.

17. The system of claim 16, wherein the repository rule manager is configured to:
obtain the repository security level of each of the plurality of repositories from the repository rule;
select one or more repositories from the plurality of repositories as candidate repositories, the repository security level of each selected candidate repository being equal to or higher than the security level of the input data,
wherein the storage repository is selected from the candidate repositories.

18. The system of claim 17, wherein the repository rule manager is configured to:
obtain availability information indicating an available data space of each of the candidate repositories; and
select a repository having a largest available data space from the candidate repositories as the storage repository.

19. The system of claim 17, wherein the multifunctional apparatus is further configured to send user information input by a user who belongs to the first group of users to the repository management device.

20. The system of claim 14, wherein the repository management device further comprises:
an additional repository rule database to store second security level information indicating a set of features required for a repository to satisfy a specific security previously set by a second group of users different from the first group of users, wherein:
the repository rule manager is further configured to logically add a value of the first security level information obtained from the first repository rule database and a value of the second security level information obtained from the additional repository rule database to generate combined security level information indicating at least one of the specific security level previously set by the first group of users and the specific security level previously set by the second group of users, and
the repository rule manager is further configured to generate a combined repository rule indicating which one of the plurality of repositories can satisfy at least one of the specific security level previously set by the first group of users and the specific security level previously set by the second group of users.

* * * * *